US012388167B2

(12) United States Patent
Jing et al.

(10) Patent No.: US 12,388,167 B2
(45) Date of Patent: Aug. 12, 2025

(54) ANTENNA AND ANTENNA SYSTEM

(71) Applicant: HUAWEI TECHNOLOGIES CO., LTD., Shenzhen (CN)

(72) Inventors: Liqiao Jing, Shenzhen (CN); Dashuang Liao, Shenzhen (CN); Guanxi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 18/343,084

(22) Filed: Jun. 28, 2023

(65) Prior Publication Data

US 2023/0335903 A1 Oct. 19, 2023

Related U.S. Application Data

(63) Continuation of application No. PCT/CN2021/071502, filed on Jan. 13, 2021.

(30) Foreign Application Priority Data

Dec. 29, 2020 (WO) ................ PCT/CN2020/140503

(51) Int. Cl.

*H01Q 1/24* (2006.01)
*H01Q 5/42* (2015.01)
*H01Q 15/00* (2006.01)

(52) U.S. Cl.

CPC ............... *H01Q 1/246* (2013.01); *H01Q 5/42* (2015.01); *H01Q 15/0026* (2013.01)

(58) Field of Classification Search

CPC ............ H01Q 1/42; H01Q 1/246; H01Q 5/40; H01Q 5/42; H01Q 5/45; H01Q 5/48; H01Q 5/49; H01Q 15/0006; H01Q 15/0013; H01Q 15/002; H01Q 15/0026; H01Q 15/0053; H01Q 15/006; H01Q 15/0066; H01Q 15/0073; H01Q 15/008; H01Q 15/0086; H01Q 15/0093; H01Q 19/108; H01Q 21/062; H01Q 21/26; H01Q 21/28

See application file for complete search history.

(56) References Cited

U.S. PATENT DOCUMENTS 2,972,743 A 2/1961 Svensson et al.
5,949,387 A 9/1999 Wu et al.

(Continued)

FOREIGN PATENT DOCUMENTS

CN 108615976 A 10/2018
CN 109149099 A 1/2019
CN 109219905 A 1/2019

(Continued)

*Primary Examiner* — Robert Karacsony
(74) *Attorney, Agent, or Firm* — Maier & Maier, PLLC

(57) ABSTRACT

An antenna and an antenna system that has the antenna, and relates to the field of wireless communication technologies. The antenna can allow a high frequency to pass through and block a low frequency or allow the low frequency to pass through and block the high frequency, and can be used in combination with other antennas to form an antenna system. In addition, in the antenna system, the antenna can also share a same antenna aperture surface with other antennas. The antenna can reduce costs while meeting a working requirement of a multi-band antenna, and can be used for flexible and changeable usage scenarios.

20 Claims, 5 Drawing Sheets

(56) References Cited

U.S. PATENT DOCUMENTS

| | | | | |
|---|---|---|---|---|
| 2018/0269577 | A1* | 9/2018 | Kosaka | H01Q 5/48 |
| 2020/0212586 | A1 | 7/2020 | Lu et al. | |

FOREIGN PATENT DOCUMENTS

| | | | |
|---|---|---|---|
| CN | 110416739 | A | 11/2019 |
| CN | 111555037 | A | 8/2020 |
| KR | 102129386 | B1 | 7/2020 |

* cited by examiner

ANTENNA AND ANTENNA SYSTEM

CROSS-REFERENCE TO RELATED APPLICATIONS

This application is a continuation of International Application No. PCT/CN2021/071502 filed on Jan. 13, 2021, which claims priority to International Patent Application No. PCT/CN2020/140503, filed on Dec. 29, 2020. The disclosures of the aforementioned applications are hereby incorporated by reference in their entireties.

TECHNICAL FIELD

The embodiments relate to the field of wireless communication technologies and to an antenna and an antenna system.

BACKGROUND

With the continuous progress of the science and technology, requirements of people for information are increasing, which pushes a wireless communication system to develop in directions of a larger capacity, a higher operating frequency band, more spectrum resources, and the like.

In a related technology, a frequency selective surface (FSS) structure on a radome in an antenna system is changed, to achieve different reflection and transmission effects on signals of multiple different frequency bands, and implement reflection and transmission of a multi-band electromagnetic wave. Although the FSS may meet a working requirement of a multi-band antenna, the FSS of this design is usually a separated island structural unit, and the FSS structure usually uses a printed circuit board (PCB) processing technology, and therefore processing costs are high. In addition, an existing high-low-frequency co-existence antenna and the FSS are usually integrated, which makes single usage scenarios of the existing high-low-frequency co-existence antenna and the FSS.

SUMMARY

Embodiments provide an antenna and an antenna system, which can meet a working requirement of a multi-band antenna, reduce costs, and can be used for flexible and changeable usage scenarios.

According to a first aspect, an embodiment provides an antenna and an antenna system thereof. The antenna includes:

- a first antenna module, configured to emit or receive a first signal;
- a signal control part, connected to the first antenna module, and configured to reflect a first signal and transmit a second signal, where a frequency of the first signal is different from a frequency of the second signal, the second signal is a signal emitted or received by a second antenna module, and the first antenna module and the second antenna module belong to different antennas; and
- a feeder network, integrated on the signal control part, configured to excite the first antenna module, where the feeder network includes at least one antenna feeder.

Therefore, signals sent or received by antenna modules belonging to different antennas are controlled by the signal control part, so that while the antenna system can meet a working requirement of a multi-band antenna, reduce costs, and can be used for flexible and changeable usage scenarios.

In a possible implementation, the signal control part includes at least one layer of metal plates in a hollow structure, where the hollow structure is a regular figure or an irregular figure, and a single layer of a metal plate is an integration structure.

Therefore, the signals generate resonance on the signal control part, so that the first signal is reflected and the second signal is transmitted.

In a possible implementation, the metal plates are multi-layered, multiple layers of the metal plates are arranged at relative intervals, plate surfaces of adjacent metal plates form a first space, and the adjacent metal plates at least partially overlap on an orthographic projection surface of one of the metal plates.

Therefore, the signals generate resonance on different metal plates, so that the different metal plates and spaces between the metal plates may form cascades, thereby generating multiple resonance points, and then reflecting the first signal and transmitting the second signal.

In a possible implementation, the metal plates are multi-layered, and hollow structures of the different metal plates are the same or different.

In a possible implementation, the adjacent metal plates include a first metal plate and a second metal plate, and the first metal plate, the second metal plate, and the first support component are an integration structure.

In a possible implementation, the metal plates are multi-layered, at least one first support component is disposed between the adjacent metal plates, one end of the first support component is connected to one of the metal plates, and the other end of the first support component is connected to another metal plate, where the first support component is made of an insulating material. Therefore, two adjacent metal plates are fixed and avoid conduction between the two adjacent metal plates.

In a possible implementation, the first support component is connected to a metal plate through a buckle.

In a possible implementation, a plate surface of a metal plate is flat or curved.

In a possible implementation, the antenna further includes: a frequency selective surface FSS, where the frequency selective surface is detachably connected to the signal control part and is located on a side away from the first antenna module.

Therefore, when frequencies of the first signal and the second signal are the same, so that the signal control part may transmit the second signal and avoid reflecting the second signal.

In a possible implementation, the frequency selective surface is connected to the signal control part through a buckle.

In a possible implementation, the antenna feeder includes at least one of a microstrip, a coaxial line, or other feeders.

In a possible implementation, there are multiple first antenna modules, and the multiple first antenna modules are arranged in an array.

In a possible implementation, the first antenna module is detachably connected to the signal control part through a second support component. When there are multiple first antenna modules, each first antenna module corresponds to one second support component. Therefore, the first antenna module is fixed on the signal control part, and the first antenna module can be conveniently mounted or removed.

In a possible implementation, both the first antenna module and the signal control part are connected to the second support component through a buckle.

According to a second aspect, an embodiment provides an antenna system, including a first antenna and a second antenna, and the first antenna and the second antenna are mounted on a same device, where the first antenna is the antenna provided by the first aspect, and the second antenna is the antenna in which the second antenna module mentioned in the antenna provided by the first aspect is located.

Therefore, in one antenna system, antenna modules of different frequencies share a same antenna aperture surface, which has little impact on an original antenna system, and improve a capacity, an operating frequency band, spectrum resources, and the like of the original antenna system.

In a possible implementation, the first antenna and the second antenna have different structures.

BRIEF DESCRIPTION OF DRAWINGS

The following briefly describes the accompanying drawings for descriptions of embodiments or a conventional technology.

DETAILED DESCRIPTION OF EMBODIMENTS

To make the objectives, solutions, and advantages of embodiments, the following describes the solutions in the embodiments with reference to the accompanying drawings.

In the description of the embodiments, words such as "exemplary", "for example", or "for example" are used to represent an example, an illustration, or a description. Any embodiment or design solution described as "exemplary", "for example", or "for example" in the embodiments should not be interpreted as being more preferred or advantageous than another embodiment or design solution. The use of the words such as "exemplary", "for example", or "for example" is intended to present related concepts in a specific manner.

In the description of the embodiments, the term "and/or" is merely an association relationship for describing associated objects, and indicates that three relationships may exist. For example, A and/or B may indicate: only A exists, only B exists, and both A and B exist. In addition, unless otherwise specified, the term "multiple" means two or more. For example, multiple systems refer to two or more systems, and multiple screen terminals refers to two or more screen terminals. The orientation or position relationship indicated by the terms "upper", "lower", "front", "rear", "inside", "outside", or the like is based on the orientation or position relationship shown in the accompanying drawings, and is merely for ease of describing and simplifying description. It is not intended to indicate or imply that the apparatus or element referred to must have a specific orientation, be constructed and operate in a specific orientation, and therefore cannot be understood as a limitation on the embodiments. The terms "first" and "second" are used merely for description purposes, and cannot be understood as indicating or implying relative importance or implicitly indicating the indicated features. Therefore, a feature limited by "first" or "second" may explicitly or implicitly include one or more features. The terms "include", "comprise", "contain", and variations thereof all mean "including, but not limited to", unless otherwise specified.

In the embodiments, it needs to be noted that: unless otherwise specified and limited, the terms "installation", "interconnection" and "connection" shall be understood in a broad sense, for example, fixed connection, detachable connection, conflict connection or integrated connection. For a person of ordinary skill in the art, a specific meaning of the foregoing terms may be understood according to a specific situation.

Figure 1:
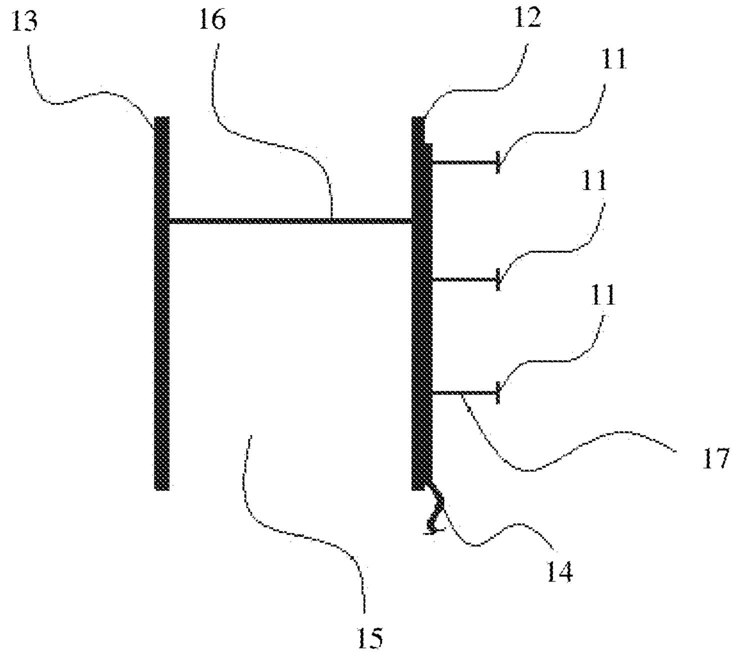
FIG. 1 is a schematic structural diagram of an antenna according to an embodiment.

FIG. 1 is a schematic structural diagram of an antenna according to an embodiment. As shown in FIG. 1, the antenna may include: a first antenna module 11, a first metal plate 12, a second metal plate 13, and a feeder network 14. The first metal plate 12 and the second metal plate 13 are arranged at relative intervals and fixedly connected. The first metal plate 12 and the second metal plate 13 may form a first space 15. In an example, both the first metal plate 12 and the second metal plate 13 are passive structures.

Figure 2A:
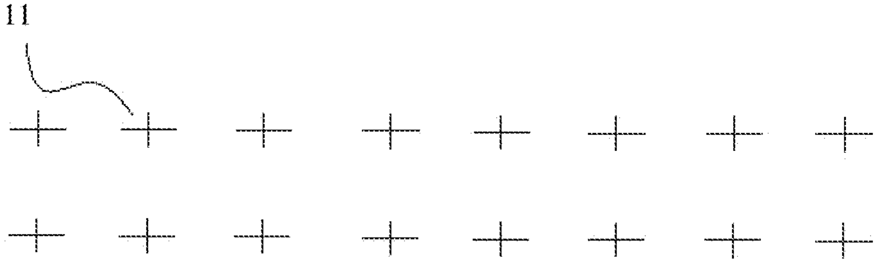
FIG. 2*a* is a schematic arrangement diagram of a first antenna module in the antenna in FIG. 1.
Figure 2B:
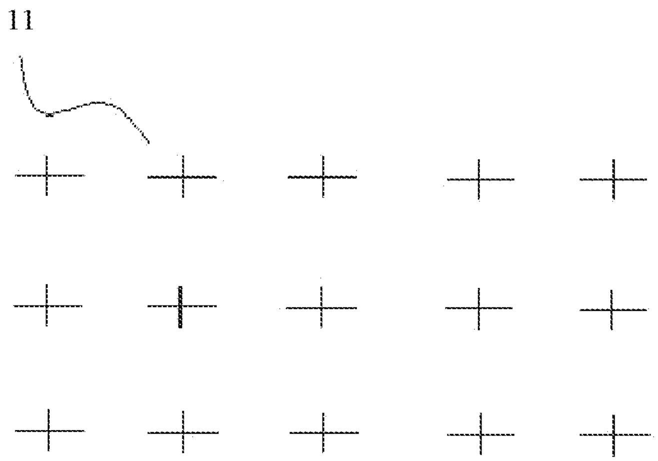
FIG. 2*b* is another schematic arrangement diagram of a first antenna module in the antenna in FIG. 1.

In this solution, there may be multiple first antenna modules 11, such as 10, 20. The multiple first antenna modules 11 may be arranged in an array. For example, as shown in FIG. 2*a*, the multiple first antenna modules 11 may be arranged in a 2×8 array. As shown in FIG. 2*b*, the multiple first antenna modules 11 may alternatively be arranged in a 3×5 array, or the like.

In an example, the first antenna module 11 may be connected to the first metal plate 12 through a second support component 17. For example, both the first metal plate 12 and the first antenna module 11 may be detachably connected to the second support component 17 through a buckle, a bolt, or the like. In this solution, the second support component 17 may be made of an insulating material, and the insulating material may be plastic. It may be understood that, in this solution, the first antenna module 11 is detachably connected to the first metal plate 12, so that a quantity of the first antenna modules 11 may be increased or decreased according to a requirement, thereby improving flexibility.

Figure 3:
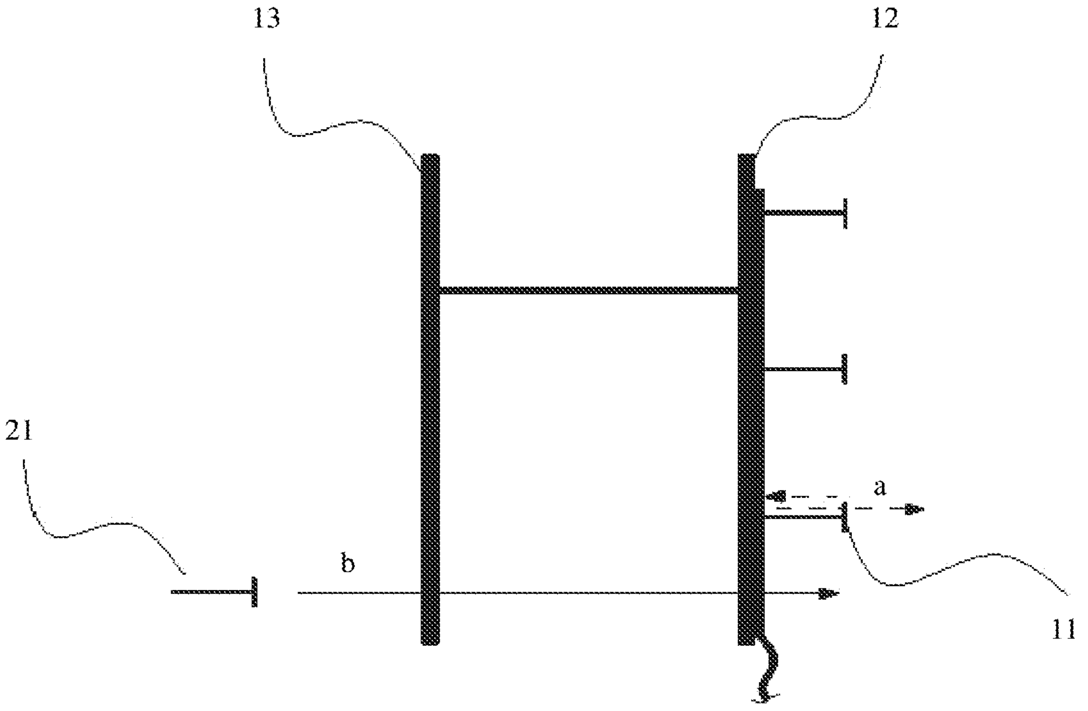
FIG. 3 is a schematic diagram of a transmission signal and a reflected signal according to an embodiment.

In this solution, the first metal plate 12, the second metal plate 13, and a first space 15 may form a signal control part. The signal control part may allow a high frequency to pass through and block a low frequency, in other words, allow a high frequency signal to pass through, and block a low frequency signal from passing through. Alternatively, the signal control part may allow the low frequency to pass through and block the high frequency, allow a low frequency signal to pass through, and block a high frequency signal from passing through. As shown in FIG. 3, in this case, the first antenna module 11 sends a signal a, where the signal a may be reflected by the first metal plate 12 and propagated in a direction away from the first metal plate 12 and the second metal plate 13, in other words, propagated towards a right side in FIG. 3. A second antenna module 21 sends a signal b, where the signal b may be sequentially propagated through the second metal plate 13, the first space 15, and the first metal plate 12 in a direction away from the first metal plate 12 and the second metal plate 13, in other words, propagated towards the right side in FIG. 3. In other words, the first metal plate 12, the second metal plate 13, and the first space 15 may form a signal control part, which may reflect a signal sent or received by the first antenna module 11, and may transmit a signal sent or received by the second antenna module 21. A frequency of the signal sent or received by the second antenna module 21 is different from a frequency of the signal sent by the first antenna module 11. In addition, the first antenna module 11 and the second antenna module 21 belong to different antennas. It may be understood that, when the frequency of the signal sent or received by the first antenna module 11 is higher than the frequency of the signal sent or received by the second antenna module 21, the signal control part is to allow a low frequency to pass through and block a high frequency. When the frequency of the signal sent or received by the first antenna module 11 is lower than the frequency of the signal sent or received by the second antenna module 21, the signal control part is to allow a high frequency to pass through and block a low frequency.

It may be understood that, when both the first antenna module 11 and the second antenna module 21 receive signals, some signals received by the first antenna module 11 may be directly received by the first antenna module 11, and the other signals are reflected by the first metal plate 12 and then received by the first antenna module 11. The signals received by the second antenna module 21 may be sequentially propagated through the first metal plate 12, the first space 15, and the second metal plate 13, and received by the second antenna module 21.

The following describes transmission and reflection effects by using an example in which the signal control part allows a high frequency to pass through and block a low frequency. However, an operating frequency band is not limited to a frequency band in the example.

Figure 4:
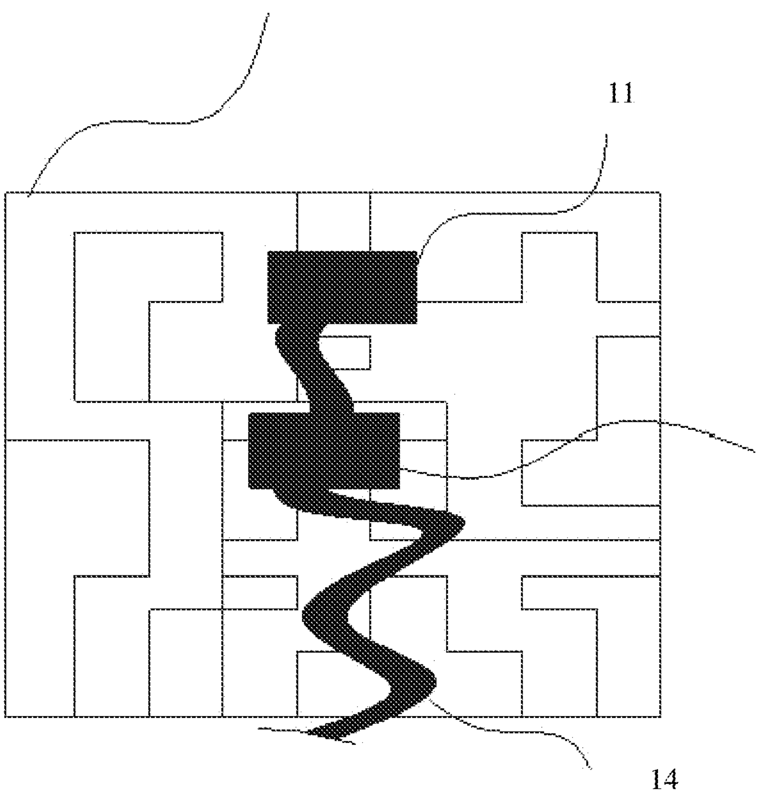
FIG. 4 is a schematic diagram of a transmission and reflection effect according to an embodiment.

As shown in FIG. 4, S21 is a curve of a transmitted signal of a signal control part, and S11 is a curve of a reflected signal of a signal control part. It can be seen in FIG. 4 that a frequency of the transmitted signal within an operating frequency band of 0.69 GHz to 0.96 GHz is less than −10 dB, and a frequency of the transmitted signal within an operating frequency band of 1.7 GHz to 2.2 GHz is greater than −0.5 dB. A frequency of the reflected signal within the operating frequency band of 0.69 GHz to 0.96 GHz is greater than −0.5 dB, and the frequency of the transmitted signal within the operating frequency band of 1.7 GHz to 2.2 GHz is less than −10 dB. It can be seen that the signal control part may transmit all signals sent by the second antenna module 21 in the operating frequency band of 1.7 GHz to 2.2 GHz. In the operating frequency band of 0.69 GHz to 0.96 GHz, all signals sent by the first antenna module 11 may be reflected.

It may be understood that, in this solution, a signal sent or received by an antenna module (such as the first antenna module 11 the second antenna module 21) generates a single resonance on the first metal plate 12 or the second metal plate 13, a first signal (such as a signal sent by the first antenna module 11) is reflected, and a second signal (such as a signal sent by the second antenna module 21) is transmitted. Cascading the first metal plate 12, the first space 15, and the second metal plate 13 may generate two resonance points, so that a broadband transmission may be generated at a high frequency and substantially total reflection to a low frequency, or the broadband transmission may be generated at a low frequency and substantially total reflection to a high frequency. In this way, the signal control part may act as allowing a high frequency to pass through and block a low frequency, or allowing a low frequency to pass through and block a high frequency. In addition, in this solution, by the characteristics of the signal control part to allow a high frequency to pass through and block a low frequency, or allow a low frequency to pass through and block a high frequency, an antenna system can also meet a working requirement of a multi-band antenna, and can be applied to multiple application scenarios.

Figure 5:
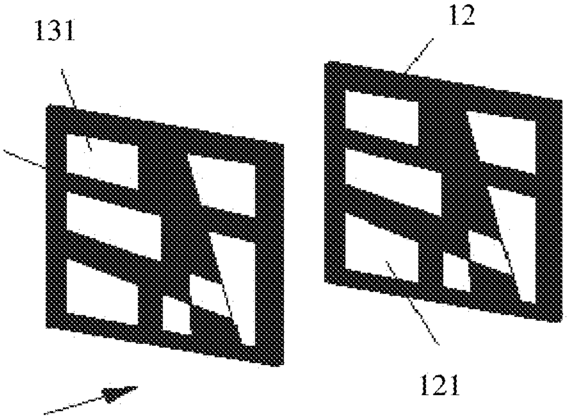
FIG. 5 is a schematic structural diagram of a first metal plate and a second metal plate in the antenna in FIG. 1.

In an example, as shown in FIG. 5, both the first metal plate 12 and the second metal plate 13 have a hollow structure. A shape of the hollow structure may be a regular figure, or may be an irregular figure. This is not limited herein. For ease of description, a hollow structure on the first metal plate 12 is referred to as a first hollow structure 121, and a hollow structure on the second metal plate 13 is referred to as a second hollow structure 131. In this solution, the first hollow structure 121 and the second hollow structure 131 may be the same or may be different. This is not limited herein. The two hollow structures do not need to be aligned in a direction of the second metal plate 13 toward the first metal plate 12, do not need to be aligned in a direction of an arrow x in the figure, and may be placed in a misplaced position, mirror symmetry, or the like. For example, the hollow structures on the first metal plate 12 and the second metal plate 13 may be one of a spiral structure, a square structure, or a circular structure. This is not limited herein. It may be understood that, in this solution, a hollow structure refers to a circular, square, or spiral permeable structure opened on a metal plate, such as a hole.

In an example, continuing to refer to FIG. 1, a first support component 16 may be provided within the first space 15. There may be one or more first support components 16. One end of the first support component 16 may be connected to the first metal plate 12, and the other end of the first support component 16 may be connected to the second metal plate 13. For example, both the first metal plate 12 and the second metal plate 13 may be connected to the first support component 16 through a buckle, a bolt, or the like. In this solution, the first support component 16 may be made of an insulating material, so as to avoid conduction between the first metal plate 12 and the second metal plate 13. In addition, the first support component 16 may also be made of a non-insulating material (such as a metal material). In this case, an area of a cross section of the first support component 16 in a plate surface direction of the first metal plate 12 may be lower than a preset area threshold. For example, when the first support component 16 is cylindrical, its diameter may be less than a preset diameter threshold.

In an example, the first metal plate 12 and the second metal plate 13 may be designed in an integrated manner through a sheet metal technology. For example, the first metal plate 12, the second metal plate 13, and the first support component 16 may be an integration structure.

Figure 6:
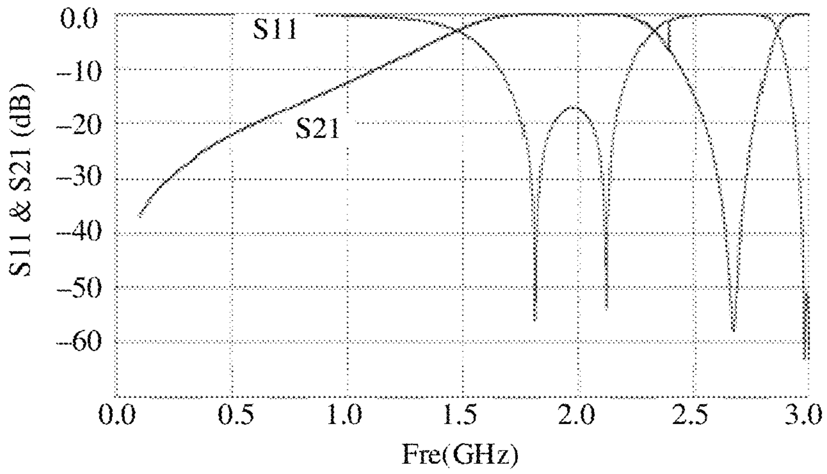
FIG. 6 is a schematic diagram of a feeder network integrated on a first metal plate in the antenna in FIG. 1.

In this solution, the feeder network 14 may be integrated on the first metal plate 12, and the feeder network 14 may be used to excite the first antenna module 11. The feeder network 14 may include at least one antenna feeder. For example, the antenna feeder may be a microstrip, or may be a coaxial line, or the like. This is not limited herein. It may be understood that an end away from the first metal plate 12 of the feeder network 14 may be connected to a signal transmit source of an antenna system, so that the feeder network 14 may excite the first antenna module 11. As shown in FIG. 6, the feeder network 14 is integrated on the first metal plate 12, and is located on the same side of the first metal plate 12 as the first antenna module 11. It may be understood that, in this solution, the feeder network 14 is integrated on the first metal plate 12, so that design complexity is reduced, installation is simple, and processing costs are low.

It may be understood that, in this solution, an antenna feeder is a transmission line that connects an antenna to a receiver and a transmitter to transmit radio frequency energy. The antenna feeder needs to have good impedance matching with the antenna, small transmission loss, a small radiation effect, a plenty of frequency bandwidth and a power capacity. The antenna feeder is classified into a parallel double line, a coaxial line, a microstrip, and a waveguide.

In an example, the antenna may further include a frequency selective surface (FSS). In this solution, the FSS is detachably connected to the second metal plate 13, for example, through a buckle, a bolt or the like. Therefore, when the frequency of signals sent or received by the antenna module on both sides of the signal control part formed by the first metal plate 12, the second metal plate 13, and the first space 15 are the same, the second metal plate 13 may be avoided through the FSS reflecting a signal sent or received by the antenna modules on the side of the second metal plate 13. Then, the signal transmitted or received by the antenna module on the side of the second metal plate 13 passes through the signal control part. It can be understood that, after the FSS is added to a side of the second metal plate 13 away from the first metal plate 12, a resonance mode of the signal control part formed by the first metal plate 12, the first space 15, and the second metal plate 13 may be changed. In this case, if the second metal plate 13 is a reflective resonance point, after the FSS is added, the second metal plate 13 is switched to a transmissive resonance point. If the second metal plate 13 is a transmissive resonance point, after the FSS is added, the second metal plate 13 is switched to a reflective resonance point.

For example, the frequency selective surface FSS may be of a patch type, or may be of a slot type. The patch type refers to periodically labeling a same metal unit on a medium surface. A filtering mechanism of the patch type is as follows: if it is assumed that an electromagnetic wave is incident on a patch type frequency selective surface from left to right. An electric field in the direction parallel to a patch generates a force on electronics to oscillate the electrons, therefore forming an induced current on a metal surface. At this point, part of energy of the incident electromagnetic wave is converted into kinetic energy needed to maintain a state of the electronic oscillation, while the other part of the energy continues to propagate through a metal wire. In other words, according to the law of conservation of energy, the energy maintaining the electronics moving is absorbed by the electronics. At a specific frequency, all the energy of the incident electromagnetic wave is transferred to the oscillation of the electronics, and an additional scattering field generated by the electronics may cancel an emission field of the electromagnetic wave on a right side of the metal wire, so that a transmission coefficient is zero. At this time, the additional field generated by the electronics also propagates to a left side of the metal wire, forming the emission field. This phenomenon is a resonance phenomenon, and this frequency point becomes a resonance point. Intuitively, at this time, the patch type frequency selective surface is reflective. In another case, when a frequency of the incident wave is not a resonance frequency, very little energy is used for maintaining an accelerated motion of the electronic, and most of the energy is propagated to the right side of the patch. In this case, the patch is "transparent" to the incident electromagnetic wave, and the energy of the electromagnetic wave may be fully propagated. At this point, the patch type frequency selective surface is transmissive.

A slot type refers to the periodically opening some metal unit slots on a metal plate. A filtering mechanism of the slot type is as follows: when a low frequency electromagnetic wave irradiates a slot type frequency selective surface, a large range of electronics are excited to move, so that the electronics absorb most of energy, and an induced current along a gap is very small, resulting in a relatively small transmission coefficient. As the frequency of the incident wave increases, the movement range of the electronics gradually becomes smaller, and the current flowing along the gap continues to increase, therefore the transmission coefficient is improved. When the frequency of the incident electromagnetic wave reaches a specific value, the electronics on both sides of the slot move back under an electric field vector of the incident wave, forming a large induced current around the gap. Because the electronics absorb a large amount of the energy of the incident wave, the electrons are also radiating energy outwards. The moving electronics radiate the electric field in a transmission direction through the gap of a dipole slot. At this time, a dipole slot array has a low reflection coefficient and a high transmission coefficient. When the frequency of the incident wave continues to increase, the movement range of the electronics is reduced, the current around the gap is divided into several sections, and the electromagnetic wave radiated by the electronics through the slot is reduced, so the transmission coefficient is reduced. The induced current generated on the metal plate away from the gap radiates the electromagnetic field in a reflection direction, and the radiation energy is limited because the electric field change period of the high frequency electromagnetic wave limits the movement of the electronics. Therefore, when the high frequency electromagnetic wave is incident, the transmission coefficient decreases and the reflection coefficient increases.

It should be noted that the signal control part mentioned in this solution can be used for reflecting signals transmitted or received by an antenna module in an antenna to which the signal control part belongs, and transmit signals transmitted or received by an antenna module in another antenna. In addition to the structure described above, the structure of the signal control part may be formed by a single layer of the metal plate having a hollow structure, or may be formed by three or more layers of the metal plate having a hollow structure. When the signal control part is formed by three or more metal plates having a hollow structure, a space (such as the first space 15) is formed between plate surfaces of adjacent metal plates. The adjacent metal plates overlap at least partially on an orthographic projection surface of one of the metal plates. For example, continuing to refer to FIG. 5, two adjacent metal plates in a direction of an arrow x in the figure do not need to be aligned, and may be placed in a misplaced position, mirror symmetry, or the like. In addition, the hollow structure on a multi-layer metal plate may be the same or different. This is not limited herein.

In an example, two adjacent metal plates may be fixed through the first support component 16 described above, or may be fixed in another manner, for example, different metal plates are sequentially fixed on a radome, a pole of an antenna or the like. In an example, in this solution, a plate surface of the metal plate included in the signal control part may be flat or curved. This is not limited herein.

In an example, when the signal control part is formed by three or more metal plates having the hollow structure, the frequency selective surface of the antenna may be detachably connected to a metal plate farthest from the first antenna module in the signal control part. In other words, the frequency selective surface is located on a side away from the first antenna module on the signal control part.

In an example, each layer of the metal plate in the signal control part is an integrated design, each layer of the metal plate is an integrated plate, and no island structure may exist on the metal plate.

It may be understood that in this solution, the signal control part and the first antenna module may be directly connected, or may be indirectly connected. This is not limited herein.

The antenna provided by this solution controls the signals sent or received by the antenna modules belonging to different antennas via the signal control part, so that while the antenna system can meet a working requirement of a multi-band antenna, reduce costs, and can be used for flexible and changeable usage scenarios.

The following describes an antenna system provided by an embodiment.

Figure 7:
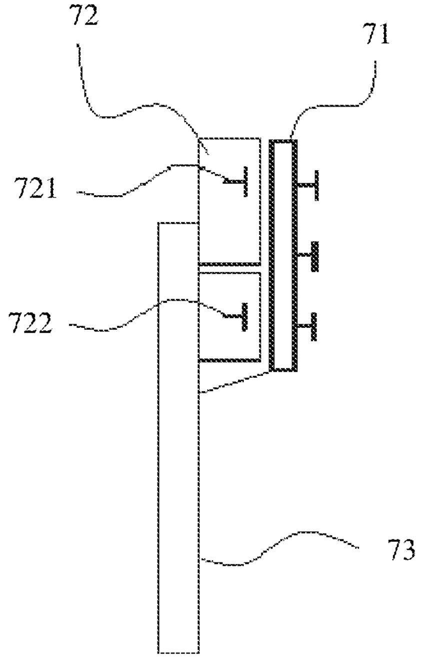
FIG. 7 is a schematic structural diagram of an antenna system according to an embodiment.

FIG. 7 is a schematic structural diagram of an antenna system according to an embodiment. As shown in FIG. 7, the antenna system includes a first antenna 71 and a second antenna 72. The first antenna 71 and the second antenna 72 may be mounted on a same device, may share one mounting space, and/or, for example, share a pole of an antenna system. In addition, the first antenna 71 and the second antenna 72 may also share one antenna aperture surface. In this solution, the first antenna 71 is an antenna in embodiment one above, and structures of the first antenna 71 and the second antenna 72 may be different or the same. It may be understood that the second antenna 72 may be an antenna on which the second antenna module 21 mentioned in embodiment one above is located.

In an example, the first antenna 71 may be fixed on a radome of the second antenna 72. As shown in FIG. 7, a third antenna module 721 in the second antenna 72 may be connected to the second metal plate 13 in the first antenna 71 through a buckle, a bolt, or the like.

It may be understood that there may also be multiple third antenna modules 721 in the second antenna 72. The multiple third antenna modules 721 may be arranged in an array manner. A specific arrangement manner may refer to the description about the first antenna module 11 above, and details are not described herein again.

Still referring to FIG. 7, when the second metal plate 13 in the first antenna 71 is relatively long in the direction of an arrow in FIG. 7, a fourth antenna module 722 may also be added to the second antenna 72, so as to further increase a capacity, an operating frequency band, a spectrum resource, and the like of the antenna system. For example, a frequency of a signal sent or received by the fourth antenna module 722 is the same as a frequency of a signal sent or received by the antenna module in the first antenna 71, where a frequency selective surface is disposed on a side of the second metal plate 13 in the first antenna 71 facing the fourth antenna module 722.

It may be understood that there may also be multiple fourth antenna modules 722 in the second antenna 72. The multiple fourth antenna modules 722 may be arranged in an array manner. A specific arrangement manner may refer to the description about the first antenna module 11 above, and details are not described herein again.

In an example, continuing to refer to FIG. 7, both the first antenna 71 and the second antenna 72 may be fixed on the antenna mast 73.

The following describes impact on the antenna system of the original second antenna 72 after the first antenna 71 is added.

Figure 8:
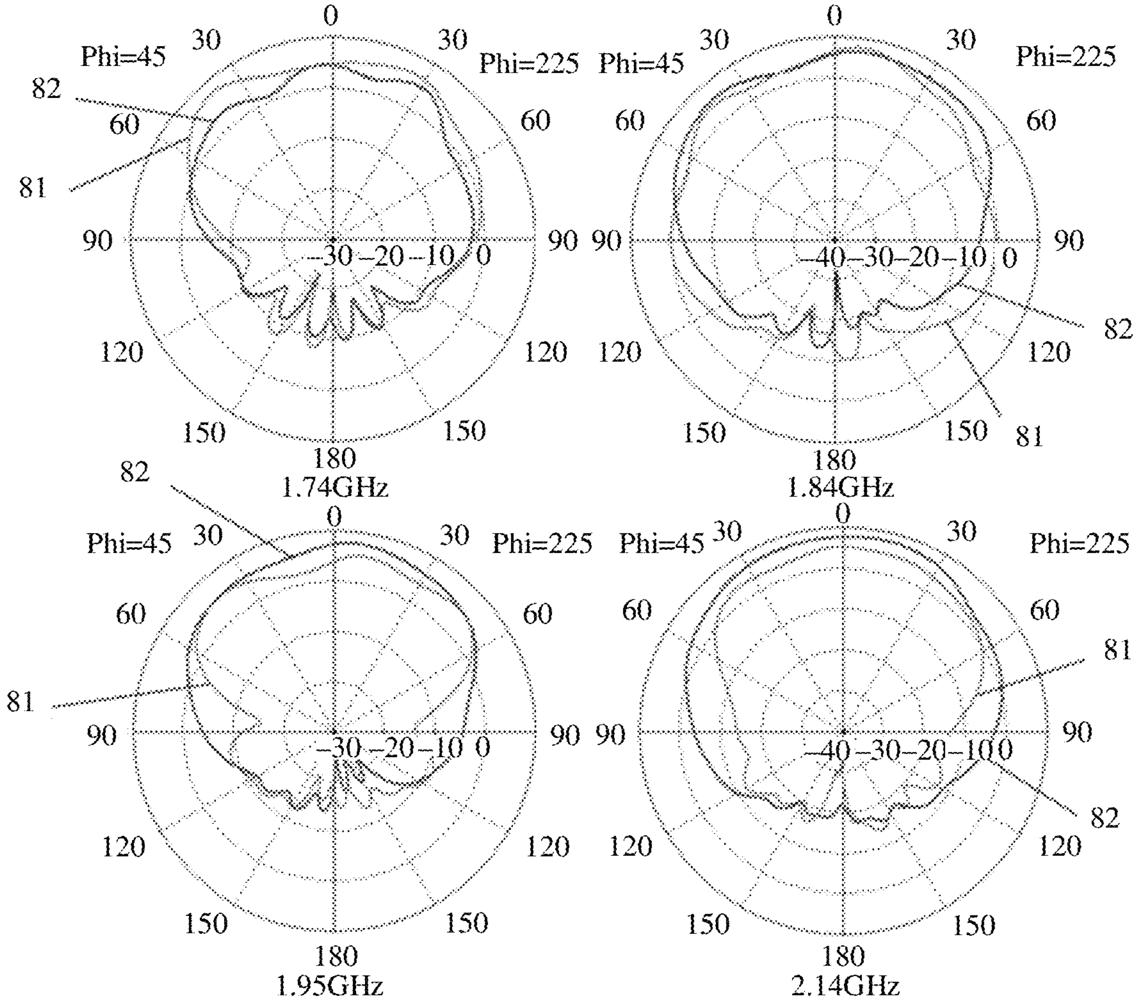
FIG. 8 is a schematic diagram of a change of an antenna radiation direction before and after a first antenna is added in the antenna system in FIG. 7.

As shown in FIG. 8, a curve 81 in the figure represents an antenna radiation direction of the antenna system when the first antenna 71 is not added, and a curve 82 represents an antenna radiation direction of the antenna system after the first antenna 71 is added. It can be understood from FIG. 8 that, in the operating frequency bands of 1.74 GHz, 1.84 GHz, 1.95 GHz, and 2.14 GHz, adding the first antenna 71 has little impact on the original antenna system.

It may be understood that the antenna in embodiment one is combined with other antennas, so that antenna modules of different frequencies may share a same antenna aperture surface, and the impact on the original antenna system is relatively small. In addition, a capacity, an operating frequency band, a spectrum resource, and the like of the original antenna system are improved.

In the embodiments, specific features, structures, materials, or characteristics may be combined in a proper manner in any one or more embodiments or examples.

Although is the embodiments are described in detail, a person of ordinary skill in the art should understand that the solutions described in the foregoing embodiments may still be modified, or some features thereof may be equivalently replaced. However, these modifications or replacements do not cause the essence of the corresponding solutions to depart from the scope of the solutions in the embodiments.

What is claimed is:

1. An antenna, comprising:

a first antenna module configured to emit or receive a first signal;

a signal control part comprising one or more metal plates and is connected to the first antenna module and configured to reflect the first signal and transmit a second signal, wherein a frequency of the first signal is different from a frequency of the second signal, the second signal is a signal emitted or received by a second antenna module, and the first antenna module and the second antenna module belong to different antennas;

a frequency selective surface (FSS), wherein the frequency selective surface is detachably connected to the signal control part and is located on a side away from the first antenna module; and a feeder network integrated on the signal control part, and configured to excite the first antenna module, wherein the feeder network comprises at least one antenna feeder.

2. The antenna according to claim 1, wherein the one or more metal plates comprises at least one layer of metal plates in a hollow structure, wherein the hollow structure is a regular figure or an irregular figure.

3. The antenna according to claim 2, wherein the metal plates are multi-layered, multiple layers of the metal plates are arranged at relative intervals, plate surfaces of adjacent metal plates form a first space, and the adjacent metal plates at least partially overlap on an orthographic projection surface of one of the metal plates.

4. The antenna according to claim 2, wherein the metal plates are multi-layered, and hollow structures of different metal plates are the same or different.

5. The antenna according to claim 2, wherein the metal plates are multi-layered, at least one first support component is disposed between the adjacent metal plates, one end of the first support component is connected to one of the metal plates, and the other end of the first support component is connected to another metal plate.

6. The antenna according to claim 5, wherein the adjacent metal plates comprise a first metal plate and a second metal plate, and the first metal plate, the second metal plate, and the first support component are an integration structure.

7. The antenna according to claim 2, wherein a plate surface of the metal plate is flat or curved.

8. The antenna according to claim 1, wherein the antenna feeder comprises at least one of a microstrip and a coaxial line.

9. The antenna according to claim 1, wherein there are multiple first antenna modules, and the multiple first antenna modules are arranged in an array.

10. The antenna according to claim 1, wherein the first antenna module is detachably connected to the signal control part through a second support component; and, when there are multiple first antenna modules, each first antenna module corresponds to one second support component.

11. The antenna according to claim 1, wherein the multiple first antenna modules array is arranged in a 3×5 format.

12. An antenna system, comprising: a first antenna and a second antenna, and the first antenna and the second antenna are mounted on a same device; wherein the first antenna comprises a first antenna module, a signal control part comprising one or more metal plates and a feeder network, wherein first antenna module is configured to emit or receive a first signal, the signal control part is connected to the first antenna module and configured to reflect the first signal and transmit a second signal, wherein a frequency of the first signal is different from a frequency of the second signal, the second signal is a signal emitted or received by a second antenna module, and the first antenna module and the second antenna module belong to different antennas;

wherein the first antenna further comprises: a frequency selective surface (FSS), wherein the frequency selective surface is detachably connected to the signal control part and is located on a side away from the first antenna module; and the feeder network is integrated on the signal control part, configured to excite the first antenna module, wherein the feeder network comprises at least one antenna feeder.

13. The antenna system according to claim 12, wherein the one more metal plates comprises at least one layer of metal plates in a hollow structure, wherein the hollow structure is a regular figure or an irregular figure.

14. The antenna system according to claim 13, wherein the metal plates are multi-layered, multiple layers of the metal plates are arranged at relative intervals, plate surfaces of adjacent metal plates form a first space, and the adjacent metal plates at least partially overlap on an orthographic projection surface of one of the metal plates.

15. The antenna system according to claim 13, wherein the metal plates are multi-layered, and hollow structures of different metal plates are the same or different.

16. The antenna system according to claim 13, wherein the metal plates are multi-layered, at least one first support component is disposed between the adjacent metal plates, one end of the first support component is connected to one of the metal plates, and the other end of the first support component is connected to another metal plate.

17. The antenna system according to claim 16, wherein the adjacent metal plates comprise a first metal plate and a second metal plate, and the first metal plate, the second metal plate, and the first support component are an integration structure.

18. The antenna system according to claim 13, wherein a plate surface of the metal plate is flat or curved.

19. The antenna system according to claim 12, wherein the antenna feeder comprises at least one of a microstrip and a coaxial line.

20. The antenna system according to claim 12, wherein there are multiple first antenna modules, and the multiple first antenna modules are arranged in an array.

* * * * *